United States Patent [19]
Scaduto

[11] Patent Number: 5,686,818
[45] Date of Patent: Nov. 11, 1997

[54] POWER SYSTEM FOR A ELECTRIC VEHICLE

[76] Inventor: Martin Scaduto, 3220 Orleans Ave., Rockford, Ill. 61114

[21] Appl. No.: 660,811

[22] Filed: Jun. 10, 1996

[51] Int. Cl.$^6$ .................................................. H02J 7/32
[52] U.S. Cl. .............................. 320/61; 290/16; 180/65.1; 322/13
[58] Field of Search .................... 320/49, 50, 61, 320/62, 63; 180/65.1, 65.2, 65.3, 65.4, 65.5; 322/9, 12, 13; 290/16, 47

[56] References Cited

U.S. PATENT DOCUMENTS

| | | | |
|---|---|---|---|
| 4,133,403 | 1/1979 | Priddy, Jr. et al. | 180/65 A |
| 4,477,764 | 10/1984 | Pollard | 320/62 |
| 5,224,563 | 7/1993 | Iizuka et al. | 180/65.3 |
| 5,230,402 | 7/1993 | Clark et al. | 180/307 |
| 5,418,437 | 5/1995 | Couture et al. | 180/65.3 X |

*Primary Examiner*—Edward Tso

[57] ABSTRACT

The power system for a electric vehicle supplying electrical energy to the batteries and motors, and to take the power load off the batteries, with the rear wheels to drive couplers and shafts and to drive the alternators and generators to supply a constant supply of electrical energy to the batteries and motors.

1 Claim, 1 Drawing Sheet

POWER SYSTEM FOR A ELECTRIC VEHICLE

BACKGROUND AND SUMMARY OF THE INVENTION

The invention relates to electric vehicle and more particulary to supplying electrical energy to the batteries and electric motors.

In todays world there is a need for a vehicle that can operate for a long period of time without having to be recharged by an outside source for hours at a time.

Other people have tried to solve this problem like in U.S. Pat. No. 4,477,764 where there is one motor driving shafts, alternators. The layout is very difficult and there is too much of a load on the batteries and the motor.

The principal object of my invention is to provide self charging energy to keep batteries charged and a constant supply of energy to the electric motors.

Another object is to take the load off the batteries so they will have a longer life.

It also is an object of the present invention to provide such a device which is of simple construction.

BRIEF DESCRIPTION OF THE DRAWING

In the drawing which illustrates preferred embodiments of the invention,and wherein like numerals refer to like parts wherever they occur.

FIG. 1 is an illustration of a power system for a electric vehicle or the like.

DETAILED DESCRIPTION

Figure 1:
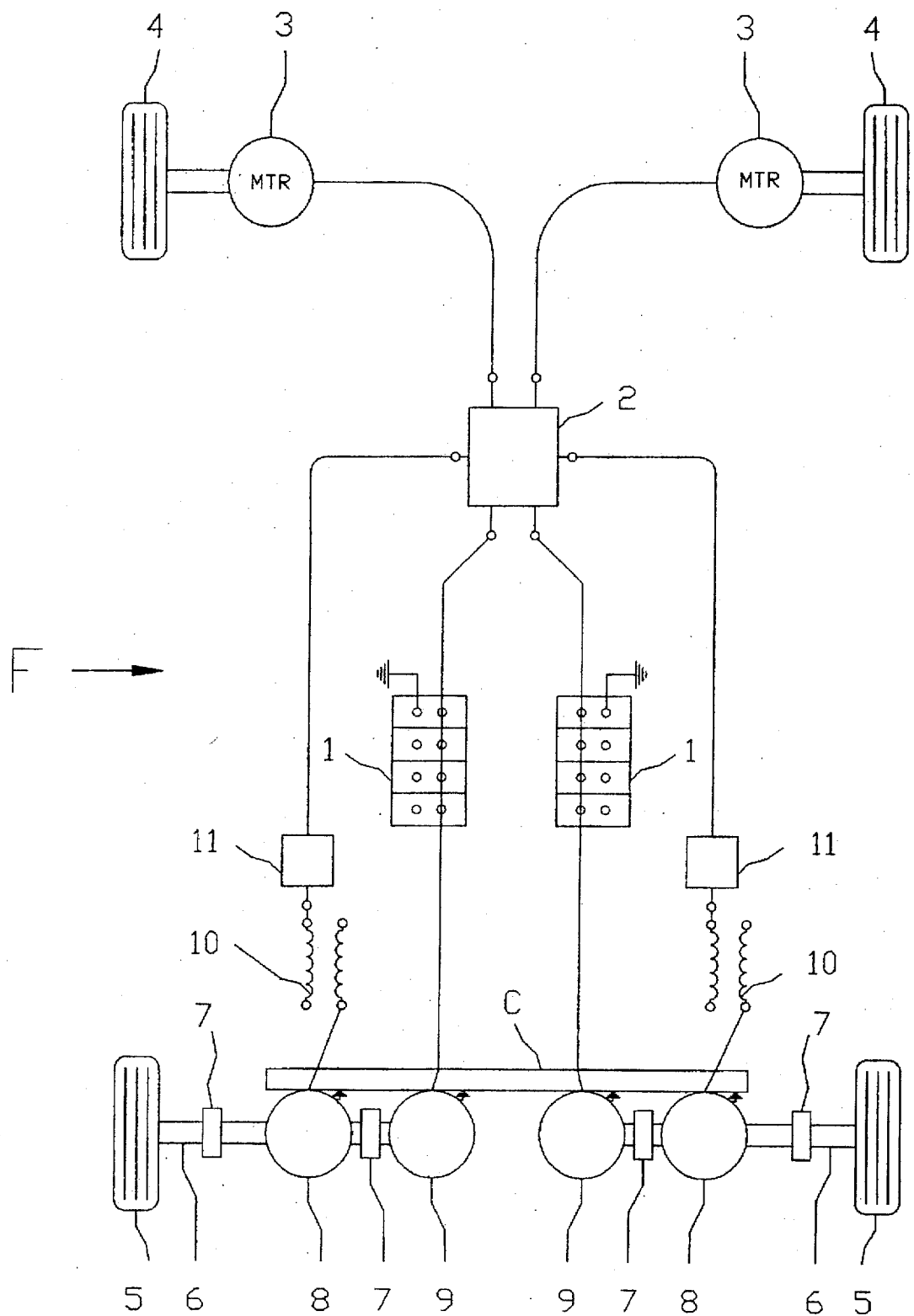

It is believed that the invention operates as follows.

Vehicle F having a number of batteries 1 to provide enough power to start the motors 3 in operation to drive the front wheels 4 which in turn will drive the rear wheels 5. It will be understood that number 1 through 5 is standard equipment and forms no part of the present invention. Shafts 6 is connected from the rear wheels which is connected to a flexible coupler 7 which in turn is connected an D.C. or an A.C. generators 8 which will provide electrical energy to the stepup transformer 10 to a voltage regulators 11 to control the voltage to provide constant supply of electrical energy to the controller 2. This will shut off the supply from the batteries.

The motors 3 will have a continuous supply of electrical energy as needed. The shaft 6 from generators 8 to coupler 7 to a conventional three phase or six phase A.C. alternators 9 having internal rectifiers and a transistorized regulator for controlling voltage and to change A.C. to D.C. (not shown). The alternators and the generators 8 are fasten to frame c.

What I claim is:

1. A power energy recovering system for an electric vehicle having two front wheels and two rear wheels comprising:

(a) two electrically driven motors, each connected to the front wheels for driving the front wheels which in turn drive the two rear wheels;

(b) a bank of batteries for supplying power to a controller for controlling power feeding to start said two electrically driven motors;

(c) two generators, each connected to the corresponding rear wheel through a shaft and a flexible coupler for converting the kinetic energy of the vehicle into electrical energy;

(d) two step-up transformers having primary and secondary sides, each of the primary sides is connected to the corresponding generator and each of the secondary sides is connected to a corresponding voltage regulator for regulating the constant voltage to the controller so that the controller can also shut down the feeding from the batteries; and (e) two ac alternators, each having rectifier and transistorized regulator connected to the corresponding generator for controlling the voltage to charge the batteries.

* * * * *